(12) United States Patent
Chaniot et al.

(10) Patent No.: US 6,299,221 B1
(45) Date of Patent: Oct. 9, 2001

(54) SYSTEM FOR THE BUTT FASTENING OF TWO PIPES

(75) Inventors: Daniel Chaniot, Marignane; François Lenhardt, La Fare les Oliviers; Robert Bucci, Mouries, all of (FR)

(73) Assignee: Eurocopter, Marseilles (FR)

( * ) Notice: Subject to any disclaimer, the term of this patent is extended or adjusted under 35 U.S.C. 154(b) by 0 days.

(21) Appl. No.: 09/458,661

(22) Filed: Dec. 10, 1999

(30) Foreign Application Priority Data

Dec. 10, 1998 (FR) .................................................. 98 15592

(51) Int. Cl.⁷ ...................................................... F16L 17/00
(52) U.S. Cl. ............................................ 285/363; 285/368
(58) Field of Search .................................. 285/363, 368, 285/412, 414, 415, 337

(56) References Cited

U.S. PATENT DOCUMENTS

| | | | | |
|---|---|---|---|---|
| Re. 23,137 | * | 7/1949 | Hobbs | 285/368 X |
| 1,631,654 | * | 6/1927 | Stoffel | 285/363 X |
| 1,652,064 | * | 12/1927 | Sweney | 285/363 X |
| 2,653,834 | * | 9/1953 | Purkhiser | 285/363 X |
| 2,714,020 | * | 7/1955 | Yates | 285/368 X |
| 2,768,847 | * | 10/1956 | Peyrin et al. | 285/368 X |
| 3,211,477 | * | 10/1965 | McCoy | 285/368 X |
| 3,214,203 | | 10/1965 | Mongodin . | |
| 3,301,576 | * | 1/1967 | Vigneron | 282/368 X |
| 3,468,561 | * | 9/1969 | Balitsky et al. | 285/363 X |
| 3,627,357 | * | 12/1971 | Sanders | 285/368 X |
| 3,752,509 | * | 8/1973 | Stafford | 285/414 X |
| 3,910,610 | * | 10/1975 | Turner et al. | 285/337 |
| 4,330,143 | * | 5/1982 | Reneau | 285/322 |
| 6,099,198 | * | 8/2000 | Kotzur et al. | 285/363 X |

FOREIGN PATENT DOCUMENTS

| | | |
|---|---|---|
| 2042164 | 1/1971 | (FR) . |
| 2073836 | 10/1981 | (GB) . |
| 2202022 | 9/1988 | (GB) . |

* cited by examiner

*Primary Examiner*—Lynne H. Browne
*Assistant Examiner*—David E. Bochna
(74) *Attorney, Agent, or Firm*—Fisher, Christen & Sabol

(57) ABSTRACT

A flange system for the butt fastening of two pipes (2, 3), for example, the gas outlet pipe and the nozzle of a turboengine, the flange (5) of one of the pipes (2) having a triangular cross section. There are provided on the flange (9) of the other pipe (3) protuberances (12) which cooperate with cuneiform wedges (15) in order to form a system of jaws pressing the flange (5) of triangular cross section between them.

11 Claims, 3 Drawing Sheets

SYSTEM FOR THE BUTT FASTENING OF TWO PIPES

This application has priority benefit of French Patent Application No. 9915592, filed on Dec. 10, 1998.

The present invention relates to a system for the butt fastening of two pipes provided with fastening flanges at their mutually confronting ends to be connected.

In the known fastening systems of this type, it is customary for the first pipe, for example the outlet pipe for the gases of a turboengine, to be equipped with a fastening flange comprising a peripherally projecting collar and provided with an annular plane outer face and with a conical inner face converging toward said outer face, at the same time moving radially away from said pipe, so that said collar has a substantially triangular cross section. In this case, there is provision, in a known way, for the fastening flange of the second pipe, for example the nozzle to be mounted on the gas outlet pipe of said turboengine, likewise to comprise a peripherally projecting collar provided with an annular plane outer face, intended to come to bear against said outer face of the first pipes, and with a conical inner face converging toward the latter outer face, at the same time moving radially away from the corresponding pipe, so that the latter collar likewise has a substantially triangular cross section.

In these known fastening systems, there is then provided a single or double clip of V-shaped cross section, which caps said collars and which bears on said conical inner faces of the latter.

Such a system has the disadvantage of being costly and heavy because of said clip. Moreover, if this clip breaks, for example as a result of wear, fatigue or the impact of a bullet, there is nothing to retain the second pipe which becomes detached from the first, and, in the case of the turboengine considered above, thus making this turboengine, which has lost its nozzle, ineffective in propelling the aircraft. The result of this may therefore be that said aircraft crashes, in particular, for example, due to a possible fire arising from the loss of the nozzle.

In order to overcome these disadvantages, it will be conceivable to modify the above-described fastening system completely, especially by modifying the fastening flange of the first pipe. However, this would not make it possible to improve in a simple way the fastening systems for engines, machines, aircraft, etc. which are already equipped with a fastening collar of triangular cross section.

Thus, the object of the present invention is to overcome the disadvantages of cost, mass and vulnerability of the known systems referred to above, whilst at the same time making it possible to preserve the fastening flange of triangular cross section of the first pipe.

To achieve this, according to the invention, the system for the butt fastening of two pipes provided with fastening flanges at their mutually confronting ends, in which system:
- the fastening flange of the first of said pipes comprises a first peripherally projecting collar provided with a first annular plane outer face and with a conical inner face converging toward said outer face, at the same time moving radially away from said first pipe; and
- the fastening flange of the second of said pipes comprises a second peripherally projecting collar provided with a second annular plane outer face intended for coming to bear against said first outer face of said first pipe, is notable in that:
  - said second collar comprises at least two peripheral radial protuberances, each provided with at least one first abutment face, each first abutment face being directed toward said second collar and having a general direction which is transverse to said second outer face;
  - associated with each radial protuberance is a cuneiform wedge comprising, on the one hand, an inclined face intended for coming to bear against said conical inner face of said first collar and, on the other hand, a second abutment face intended for coming to bear against said first abutment face of the corresponding radial protuberance; and
  - associated with each radial protuberance are clamping means making it possible to press both the inclined face of the corresponding cuneiform wedge against said conical inner face of said first collar and said second abutment face of said wedge against said first abutment face of said radial protuberance.

Thus, it can be seen that the fastening system of the invention comprises at least two individual and independent localized fastening locations making it possible to overcome the abovementioned disadvantages, each of said fastening locations being provided with a fixed jaw consisting of a radial protuberance and a movable jaw consisting of a cuneiform wedge, and each pair of a fixed jaw and a movable jaw holding by clamping a localized portion of the collar of triangular cross section of said first pipe.

Said clamping means may be of the screw/nut type, each screw passing with play through the corresponding radial protuberance and cuneiform wedge. Of course, said clamping means may comprise in a known way selflocking nuts or be provided with selflocking washers. It would be noted that said first abutment faces of the radial protuberances prevent said screws from undergoing shearing stress and avoid the slipping of the cuneiform wedges and therefore errors of orthogonality of the screws, such errors undoubtedly causing dulling or marking of the flanges and wedges.

Preferably, in order to increase even further the rigidity of the fastening obtained by means of such a pair of jaws, there is provision:
- for each peripheral radial protuberance to be provided, furthermore, with a third abutment face at least approximately parallel to said second outer face of said second collar;
- for each cuneiform wedge to be provided, furthermore, with a fourth abutment face at least approximately orthogonal to said second abutment face; and
- for said clamping means to press both:
  - the inclined face of the cuneiform wedge against the conical inner face of said first collar,
  - the second abutment face of the cuneiform wedge against said first abutment face of said protuberance, and
  - the fourth abutment face of the cuneiform wedge against said third abutment face of said protuberance.

The cuneiform wedges may be individual and unconnected to one another. On the contrary, they may be integral with one another and, if appropriate, each be formed by a portion of a ring machined to the profile of said wedges.

Advantageously, said second collar of the second pipe comprises a plurality of peripheral radial protuberances.

Preferably, means are provided for the peripheral centering of said protuberances of said second collar relative to said first collar of the fastening flange of said first pipe.

Furthermore, means may be provided for centering said fastening flanges relative to one another.

The figures of the accompanying drawing will make it easy to understand how the invention can be implemented. In these figures, identical references designate like elements.

Figure 1:
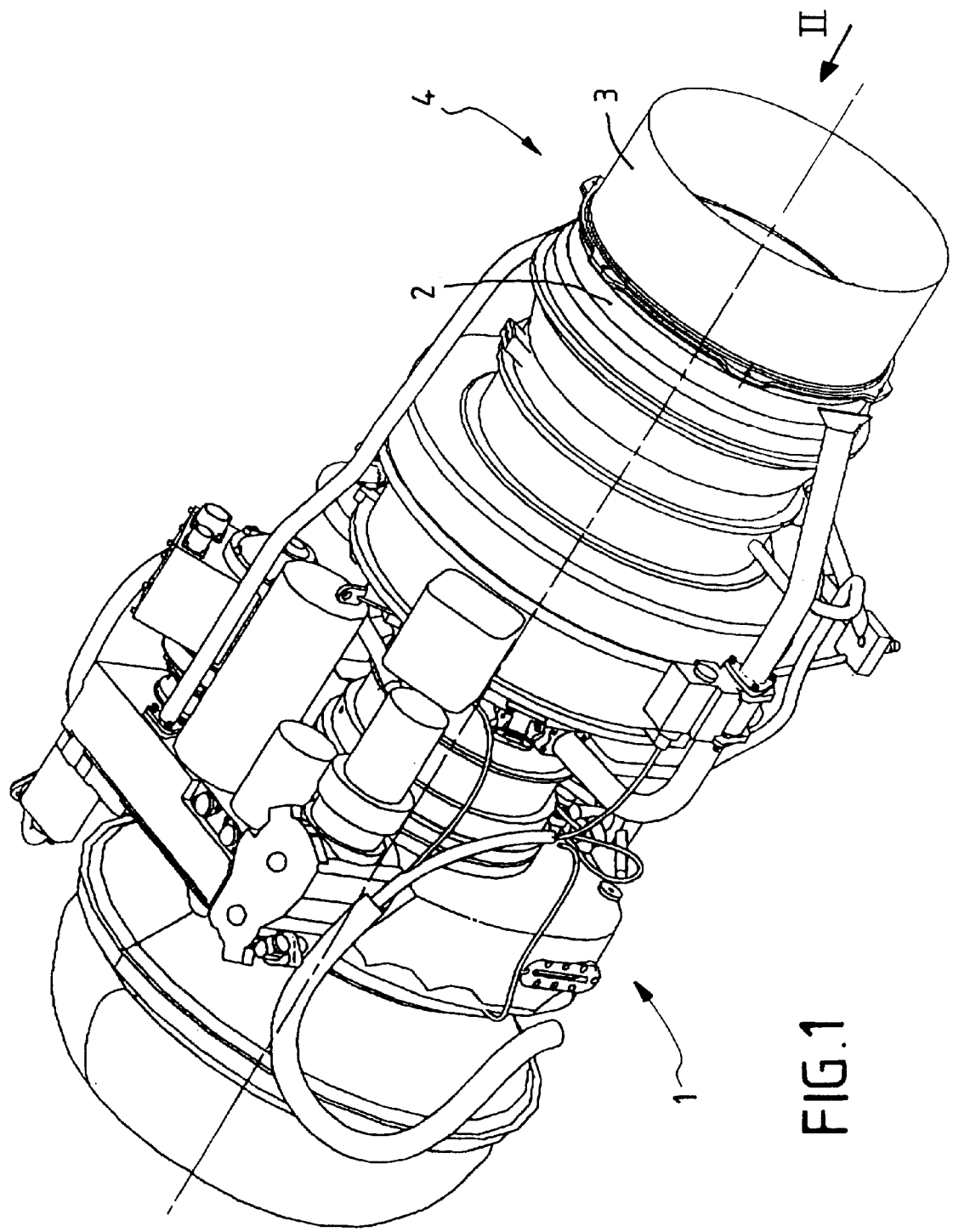
FIG. 1 is a diagrammatic perspective view of a turboengine for a helicopter, said turboengine being equipped with the fastening system according to the present invention.

The engine 1, shown diagrammatically in FIG. 1, comprises an outlet pipe 2 for the gas streams, to which a pipe 3 forming a nozzle is butt-connected by means of the fastening system 4 according to the present invention.

Figure 2:
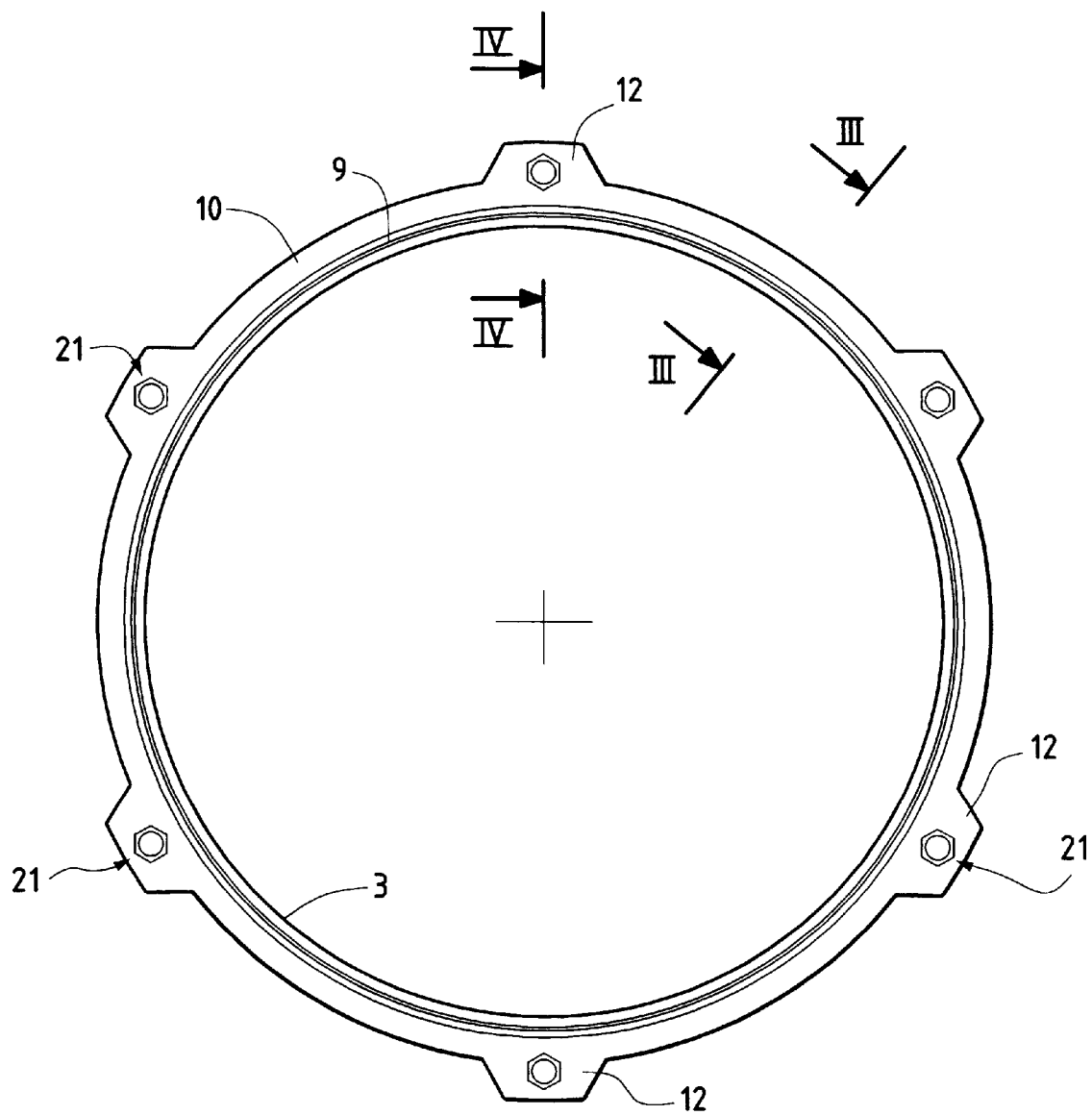
FIG. 2 is a view of the rear of said turboengine according to the arrow II of FIG. 1, illustrating the fastening system on a larger scale.
Figure 3:
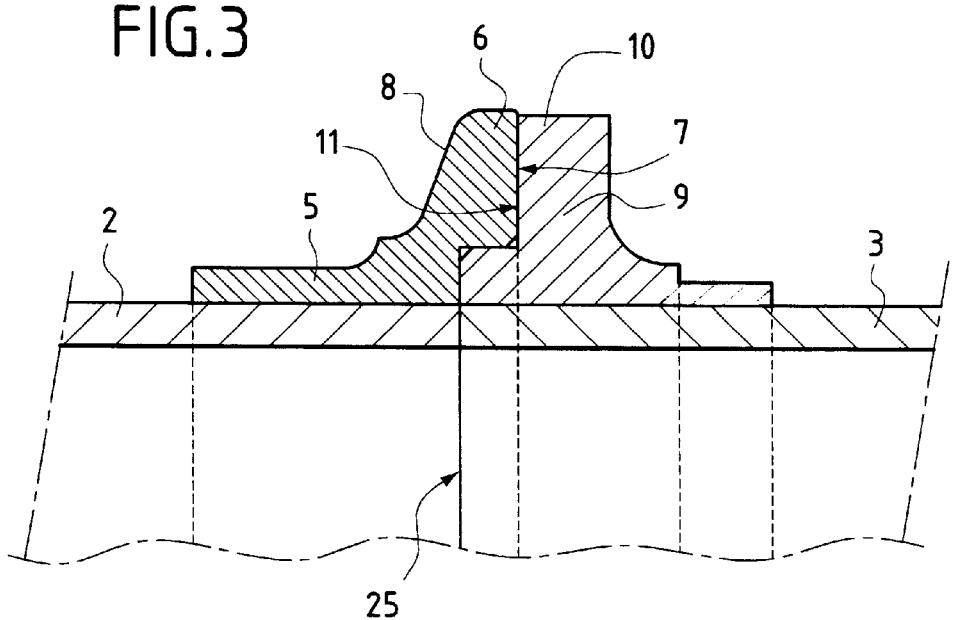
FIGS. 3 and 4 are sections taken respectively along the lines III—III and IV—IV of FIG. 2.
Figure 4:
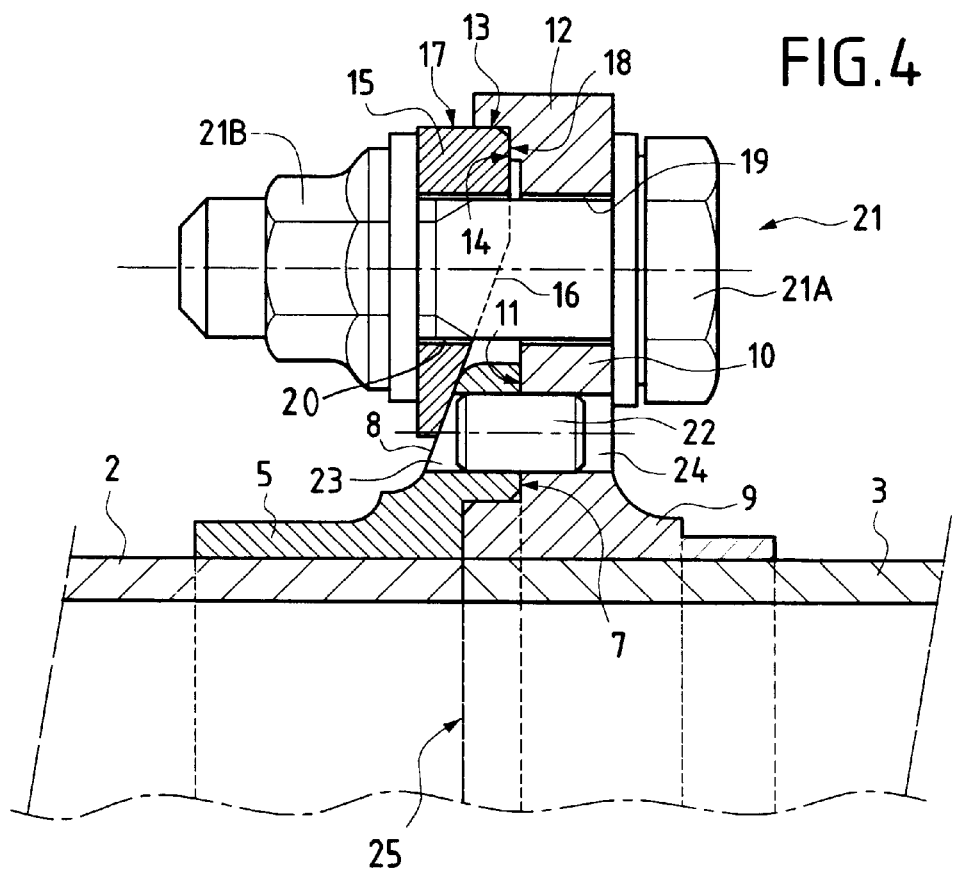

As shown in FIGS. 2, 3 and 4, the fastening system 4 comprises:

a metal fastening flange 5 fastened by all known means (not shown) to that end of the pipe 2 to which the pipe 3 is to be attached. The fastening flange 5 comprises a collar 6 which projects peripherally relative to said pipe 2 and which is provided with an annular plane outer face 7 and with a conical inner face 8. The conical inner face 8 converges toward the plane outer face 7, at the same time moving radially away from said pipe 2; and a metal fastening flange 9 fastened by all known means (not shown) to that end of the pipe 3 which is to be attached to the pipe 2 and comprising a collar 10 which projects peripherally relative to said pipe 3 and which is provided with an annular plane outer face 11.

Moreover, the collar 10 comprises a plurality of peripheral radial protuberances 12 (see FIG. 2).

As shown in FIG. 4, each peripheral radial protuberance 12 comprises an abutment face 13 directed toward the collar 10 and having a general direction which is transverse to the outer face 11. The abutment face 13 may be plane or cylindrical. Moreover, each protuberance 12 comprises another abutment face 14 parallel to the inner face 11.

The fastening system 4 comprises, furthermore, cuneiform wedges 15 independent of one another or integral with one another. The wedges 15 may be formed by portions of a machined ring. Each wedge 15 is associated with a radial protuberance 12 and comprises an inclined face 16 (corresponding to the conical face 8), an abutment face 17 (corresponding to the abutment face 13) and an abutment face 18 orthogonal to the abutment face 17 and corresponding to the abutment face 14.

The protuberances 12 and wedges 15 are pierced with respective holes 19 and 20 for the passage of clamping means 21 of the screw 21A/nut 21B type, the action of which makes it possible to press simultaneously one against the other the outer faces 7 and 11, the inclined conical faces 8 and 16, the abutment faces 13 and 17 and the abutment faces 14 and 18.

Thus, the protuberances 12 form fixed jaws, whilst the wedges 15 form movable jaws, each pair of a fixed jaw and a movable jaw clamping a localized part of the collar 6 of the flange 5.

The protuberances 12 can be centered peripherally relative to the flange 5 by means of centering fingers 22 seated in perforations 23 and 24 of collars 6 and 10. Moreover, said pipes 2 and 3, and consequently the flanges 5 and 9, may be centered relative to one another by a system for the interlocking of machined shoulders 25 in said flanges 5 and 9.

What is claimed is:

1. A system for the butt fastening of two pipes (2, 3) provided with fastening flanges (5, 9) at their mutually confronting ends, in which system:

the fastening flange (5) of the first of said pipes (2) comprises a first peripherally projecting collar (6) provided with a first annular plane outer face (7) and with a conical inner face (8) converging toward said outer face (7), at the same time moving radically away from said first pipe (2);

the fastening flange (9) of the second of said pipes (3) comprises a second peripherally projecting collar (10) provided with a second annular plane outer face (11) intended for coming to bear against said first outer face (7) of said first pipe (2);

at least one cuneiform wedge (15) comprising an inclined face (16) is provided in such a way that this inclined face (16) comes to bear against said conical inner face (8) of said first collar; and clamping means (21) are provided for pressing said first and second annular plane outer faces (7 and 11) one against the other by means of one of said at least one cuneiform wedge (15), wherein:

said second collar (10) comprises at least two peripheral radial protuberances (12), each provided with at least one first abutment face (13) which is directed toward said second collar (10) and which has a general direction transverse to said second outer face (11);

associated with each radial protuberance (12) is one of said at least one cuneiform wedge (15) comprising, furthermore, a second abutment face (17) intended for coming to bear against said first abutment face (13) of the corresponding radial protuberance (12); and associated with each radial protuberance (12) are such clamping means (21) making it possible to press both the inclined face (16) of the corresponding cuneiform wedge (15) against said conical inner face (8) of said first collar (6) and said second abutment face (17) of said wedge (15) against said first abutment face (13) of said radial protuberance (12).

2. The fastening system as claimed in claim 1, wherein said cuneiform wedges (5) are individual.

3. The fastening system as claimed in claim 1, wherein said cuneiform wedges (15) are integral with one another.

4. The fastening system as claimed in claim 3, wherein said cuneiform wedges (15) are formed by portions of a ring machined to the profile of said wedges.

5. The fastening system as claimed in claim 1, wherein said second collar (10) comprises a plurality of at least three peripheral radial protuberances (12).

6. The fastening system as claimed in claim 1, wherein there are means (22, 23, 24) for the peripheral centering of said peripheral radial protuberances (12) relative to said first collar (6) of the fastening flange (5) of said first pipe (2).

7. The fastening system as claimed in claim 1, wherein there are means (25) for centering said pipes (2, 3).

8. The fastening system as claimed in claim 1, wherein said first abutment face (13) of the protuberances (12) is plane.

9. The fastening system as claimed in claim 1, wherein said first abutment face (13) of the protuberances (12) is cylindrical.

10. A system for the butt fastening of two pipes (2, 3) provided with fastening flanges (5, 9) at their mutually confronting ends, in which system:

the fastening flange (5) of the first of said pipes (2) comprises a first peripherally projecting collar (6) provided with a first annular plane outer face (7) and with a conical inner face (8) converging toward said outer face (7), at the same time moving radially away from said first pipe (2);

the fastening flange (9) of the second of said pipes (3) comprises a second peripherally projecting collar (10) provided with a second annular plane outer face (11) intended for coming to bear against said first outer face (7) of said first pipe (2);

at least one cuneiform wedge (15) comprising an inclined face (16) is provided in such a way that this inclined face (16) comes to bear against said conical inner face (8) of said first collar; and clamping means (21) are provided for pressing said first and second annular plane outer faces (7 and 11) one against the other by means of one of said at least one cuneiform wedge (15), said clamping means (21) are of the screw/nut type, each screw (21A) passing with play through the corresponding radial protuberance (12) and said cuneiform wedge (15); wherein:

said second collar (10) comprises at least two peripheral radial protuberances (12), each provided with at least one first abutment face (13) which is directed toward said second collar (10) and which has a general direction transverse to said second outer face (11);

associated with each radial protuberance (12) is one of said at least one cuneiform wedge (15) comprising, furthermore, a second abutment face (17) intended for coming to bear against said first abutment face (13) of the corresponding radial protuberance (12); and associated with each radial protuberance (12) are such clamping means (21) making it possible to press both the inclined face (16) of the corresponding cuneiform wedge (15) against said conical inner face (8) of said first collar (6) and said second abutment face (17) of said wedge (15) against said first abutment face (13) of said radial protuberance (12).

11. A system for the butt fastening of two pipes (2, 3) provided with fastening flanges (5, 9) at their mutually confronting ends, in which system:

the fastening flange (5) of the first of said pipes (2) comprises a first peripherally projecting collar (6) provided with a first annular plane outer face (7) and with a conical inner face (8) converging toward said outer face (7), at the same time moving radically away from said first pipe (2);

the fastening flange (9) of the second of said pipes (3) comprises a second peripherally projecting collar (10) provided with a second annular plane outer face (11) intended for coming to bear against said first outer face (7) of said first pipe (2);

at least one cuneiform wedge (15) comprising an inclined face (16) is provided in such a way that this inclined face (16) comes to bear against said conical inner face (8) of said first collar; and clamping means (21) are provided for pressing said first and second annular plane outer faces (7 and 11) one against the other by means of one of said at least one cuneiform wedge (15), wherein:

said second collar (10) comprises at least two peripheral radial protuberances (12), each provided with at least one first abutment face (13) which is directed toward said second collar (10) and which has a general direction transverse to said second outer face (11);

associated with each radial protuberance (12) is one of said at least one cuneiform wedge (15) comprising, furthermore, a second abutment face (17) intended for coming to bear against said first abutment face (13) of the corresponding radial protuberance (12);

associated with each radial protuberance (12) are such clamping means (21) making it possible to press both the inclined face (16) of the corresponding cuneiform wedge (15) against said conical inner face (8) of said first collar (6) and said second abutment face (17) of said wedge (15) against said first abutment face (13) of said radial protuberance (12);

each peripheral radial protuberance (12) is provided, furthermore, with a third abutment face (14) at least approximately parallel to said second outer face (11) of said second collar (10);

each cuneiform wedge (15) is provided, furthermore, with a fourth abutment face (18) at least approximately orthogonal to said second abutment face (17); and said clamping means (21) press both,
the inclined face (16) of the corresponding cuneiform wedge (15) against the conical inner face (8) of said first collar (6),
the second abutment face (17) of the cuneiform wedge (15) against said first abutment face (13) of said protuberance (12), and
the fourth abutment face (18) of the cuneiform wedge (15) against said third abutment face (14) of said protuberance (12).

* * * * *